(12) United States Patent
Wolff et al.

(10) Patent No.: US 6,296,390 B1
(45) Date of Patent: Oct. 2, 2001

(54) SINGLE PLATE HYDRODYNAMIC BEARING WITH EXTENDED SINGLE JOURNAL BEARING

(75) Inventors: Etoli Wolff, Sunnyvale; Samnathan Murthy, Santa Cruz; Norbert Steven Parsoneault, Scotts Valley; Hans Leuthold, Santa Cruz, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/257,469

(22) Filed: Feb. 24, 1999

Related U.S. Application Data

(63) Continuation-in-part of application No. 08/976,373, filed on Nov. 21, 1997, which is a continuation of application No. 08/279,199, filed on Jul. 22, 1994, now Pat. No. 5,533,812.
(60) Provisional application No. 60/075,822, filed on Feb. 24, 1998.

(51) Int. Cl.$^7$ ............................................ F16C 17/10
(52) U.S. Cl. ........................................................ 384/112
(58) Field of Search ................................. 384/113, 107, 384/112, 115, 114

(56) References Cited

U.S. PATENT DOCUMENTS

| | | | |
|---|---|---|---|
| 2,397,124 | * | 3/1946 | Buffington et al. . |
| 5,415,476 | * | 5/1995 | Onishi . |
| 5,685,647 | * | 11/1997 | Leuthold et al. ............... 384/113 |
| 5,956,204 | * | 9/1999 | Dunfield et al. ............... 384/113 |

* cited by examiner

*Primary Examiner*—Lenard A. Footland
(74) *Attorney, Agent, or Firm*—Thomason, Moser & Patterson, LLP

(57) ABSTRACT

A hydrodynamic bearing having a shaft relatively rotatable with rest to a surrounding sleeve and having a thrust plate of or near one end thereof. The shaft and sleeve define a journal bearing extending substantially the full length of the two relatively rotating parts.

11 Claims, 7 Drawing Sheets

SINGLE PLATE HYDRODYNAMIC BEARING WITH EXTENDED SINGLE JOURNAL BEARING

CROSS-REFERENCE TO RELATED APPLICATIONS

The present application is a continuation-in-part of U.S. application Ser. No. 08/976,373, filed Nov. 21, 1997, and incorporated by reference, which in turn is a continuation of U.S. application Ser. No. 08/279,199, filed Jul. 22, 1994, now U.S. Pat. No. 5,533,812, issued Jul. 9, 1996. The application is based on, and priority claimed to provisional application No. 60/075,822, filed Feb. 24, 1998.

FIELD OF THE INVENTION

The present invention relates to the field of hydrodynamic bearing assemblies, and especially to such assemblies adapted to have improved stiffness, reduced power consumption, and long useful life.

BACKGROUND OF THE INVENTION

Many motors, spindles and the like are based on bearing cartridges comprising a shaft and sleeve and bearings supporting these two elements for relative rotation. For example, a shaft may be mounted by means of two ball bearings to a sleeve rotating around the shaft. One of the bearings is typically located at each end of the shaft/sleeve combination. These bearings allow for rotational movement between the shaft and the hub while maintaining accurate alignment of the sleeve to the shaft. The bearings themselves are normally lubricated by grease or oil.

The conventional bearing system described above is prone, however, to several shortcomings. First is the problem of vibration generated by the balls rolling on the raceways. Ball bearings in such cartridges frequently run under conditions that result in physical contact between raceways and balls; this occurs in spite of the lubrication layer provided by the bearing oil or grease. Hence, bearing balls running on the generally even and smooth, but microscopically uneven and rough raceways, transmit this surface structure as well as heir imperfections in sphericity in the form of vibration to the rotating element. This vibration results in misalignment between whatever device is supported for rotation and the surrounding environment. This source of vibration limits therefore the accuracy and the overall performance of the system incorporating the cartridge.

Another problem is related to damage caused by shocks and rough handling. Shocks create relative acceleration between stationary and rotating parts of a system which in turn shows up as a force across the bearing system. Since the contact surfaces in ball bearings are very small, the resulting contact pressures may exceed the yield strength of the bearing material and leave permanent deformation and damage on raceways and balls, which would also result in tilt, wobble, or unbalanced operation of the bearing.

Moreover, mechanical bearings are not always scalable to smaller dimensions. This is a significant drawback since the tendency in the high technology industry has been to continually shrink the physical dimensions.

As an alternative to conventional ball bearing spindle systems, researchers have concentrated much of their efforts on developing a hydrodynamic bearing. In these types of systems, lubricating fluid—either gas or liquid (which may even include air)—as the actual bearing surface between two relatively rotating parts. As used in a typical motor, these comprise a shaft and a surrounding sleeve or hub. Exemplary liquid lubricants comprising oil, more complex ferromagnetic fluids, or even air have been utilized for use in hydrodynamic bearing systems. Such bearings scale well to small sizes without being prone to many of the defects of ball bearings outlined above. Because of the lack of metal-to-metal contact, the bearing has a long life. Because of the stiffness of the bearing, it is highly stable and useful as a reference in devices such as optical encoders and the like.

However, it is apparent that a difficulty with such a hydrodynamic bearing design is their sensitivity both to machining tolerances and the temperature ranges across which they are utilized. Both of these issues are critical in hydrodynamic bearings, because the very narrow gaps between the rotating and stationary parts. In known designs, it is important to have a very small gap to establish a very stiff bearing which does not allow for any tilting of the rotating part relative to the stationary part. However, greater stiffness in known bearings leads to greater power consumption, also because of the closeness of the relatively rotating bearing surfaces.

Thus it is clear that a number of considerations must be balanced in designing an effective hydrodynamic bearing cartridge.

SUMMARY OF THE INVENTION

It is therefore a primary objective of the present invention to provide a hydrodynamic bearing which is simple in design, and highly adaptable and scalable for use in many different environments.

It is a further objective of the invention to provide a hydrodynamic bearing having a reliable, repeatable design so that the bearing has the necessary stiffness to be used in applications which have no tolerance for tilt, wobble, or other inaccuracies.

It is a further and related objective of the present invention to provide a hydrodynamic bearing in which gap tolerances are widened so that power consumption is reduced. A related objective of the invention is to provide a hydrodynamic bearing design having diminished sensitivity to temperature and machining tolerances, thereby providing a greater consistency in the dynamic performance of the invention.

These and other objectives are achieved by providing a hydrodynamic bearing having a shaft relatively rotatable with respect to a surrounding sleeve and having a thrust plate of or near one end thereof. The shaft and sleeve define a journal bearing extending substantially the full length of the two relatively rotating parts. The groove pattern, which is preferably on the sleeve of the journal bearing, is constant over the length of the single journal, rather than interrupted near the center to form upper and lower bearings. This substantially enhances the bearing stiffness, allowing the gap between shaft and sleeve to be widened. The thrust plate is supported on the outer surface of the shaft, and grooves or openings extend axially between the radially inner surface of the thrust plate and the outer surface of the shaft so that the fluid path over both surfaces of the thrust plate and coupled to the journal bearing, maintaining fluid supply over all bearing surfaces without providing an internal reservoir in the shaft.

Preferably, the ratio of journal bearing length to shaft width is about 1:1; the groove pattern is sinusoidal; and the center of the pattern is offset toward the thrust plate to create a pressure differential toward the thrust plate and away from the end of the bearing distal from the thrust plate so no fluid is lost.

Other features and advantages of the present invention will be apparent to a person of skill in the art who studies the present invention disclosure. Therefore, the scope of the present invention is to be limited only by the following claims.

DETAILED DESCRIPTION OF A PREFERRED EMBODIMENT

An improved hydrodynamic bearing having added stiffness and therefore making available a wider gap width in the bearing is disclosed herein in additional features and advantage use of one hydrodynamic journal bearing along the shaft and sleeve which define the journal bearing rather than two separate journal bearings provides a better operating vibration frequency response and improved power consumption, as compared with the prior art. Therefore, while the present hydrodynamic bearing invention has uses in many other products, it is disclosed for use here in a disk drive where the tilt and vibration imposed on any disk is dramatically reduced; further, the reduction in power consumption is very important, especially in small disk drives such as are used in portable computers and the like.

Figure 1A:
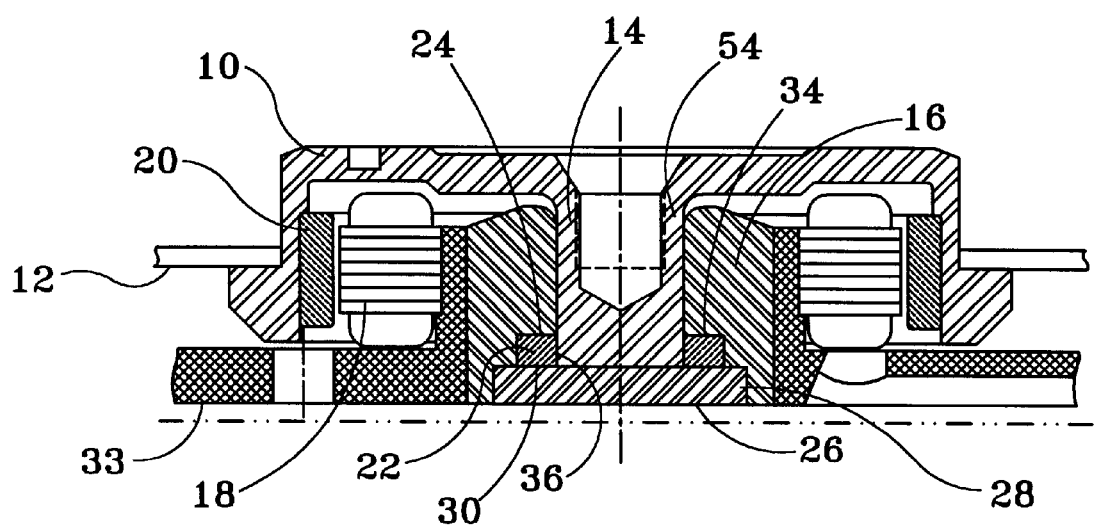
FIG. 1A is a vertical sectional view of a motor designed in accordance with the present invention incorporating a single journal bearing extending along the shaft of the motor.
Figure 1B:
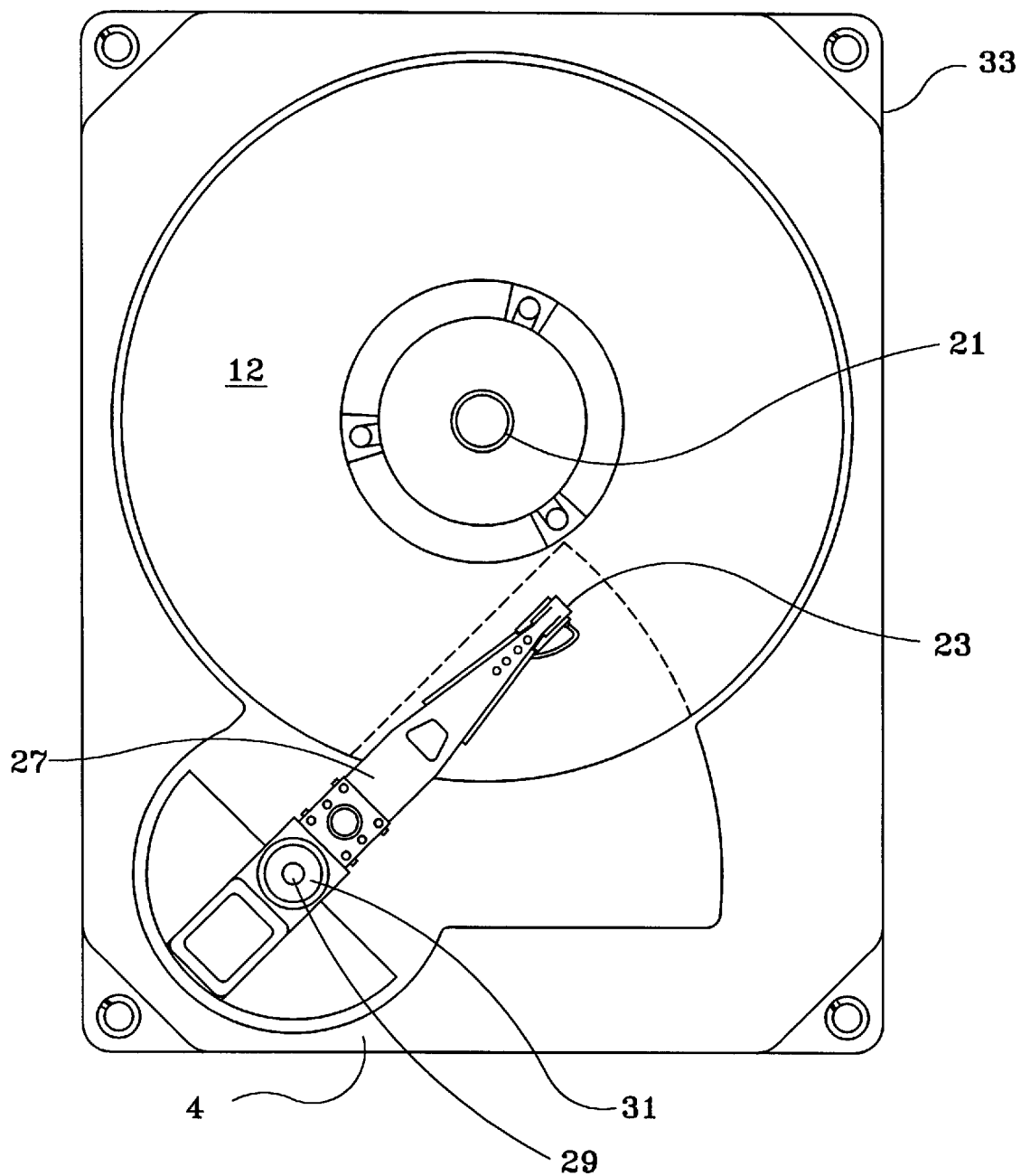
FIG. 1B is a plan view of a motor in which the hydrodynamic bearing is useful to support the shaft for rotation within the sleeve.

Thus, tuning to FIG. 1, this figure shows the primary elements of a spindle motor adapted to be mounted in a disk drive, and having a rotating shaft supporting or integrated with a hub 10 which supports one or more disks 12 for rotation. Referring specifically to FIG. 1B which is a top plan view of the basic elements of a disk drive, this figure shows one or more disks 12 being rotated by the spindle motor of FIG. 1A and not shown in this figure. As the disks 12 rotate, transducer 24 mounted on the end of an actuator 27 is selectively positioned by a voice call motor 29 rotating about a pivot 31 to move the transducer from track-to-track over the surface of the disk. All of these elements are mounted in a housing 33 which is typically air-tight to minimize the possibility of contaminants reaching the surface of the disk.

Returning to FIG. 1A, which is a vertical section of the spindle motor, the motor includes a shaft 14 rotating within a sleeve 16. The rotation is caused by the interaction between the widening 18 mounted on the outer surface of the sleeve and a magnet 20 supported on the inner surface of the hub 10. In this particular embodiment, the hub 10 is integrated with the shaft 14, the shaft rotating within the sleeve 16. However, the principles of the bearing of this invention could as easily be utilized in a system where the sleeve is rotating and the shaft is fixed.

Considering more specifically the shaft and sleeve combination and the hydrodynamic, bearing which supports the shaft for rotation, the shaft 14 in this instance supports a thrust plate 22 at or near one end thereof which rotates within a recess formed by a surface 24 of the sleeve 16 which defines one counterplate to the thrust plate 22, and a counterplate 26 which is pressed into a second recess 28 in the sleeve 16 and defines the opposite counterplate 30 to the thrust plate 24. A fluid journal bearing is formed and maintained between the facing surfaces of the shaft 14 and the sleeve 16; a thrust bearing is defined between each of the radially extending surfaces of the thrust plate 22 and the facing counterplate surfaces provided by the counterplate 26 and the sleeve 16. A fluid circulation and distribution path is completed through one or more grooves which are defined between the axial surface 34 of the trust plate 22 and the outer axial surface 36 of the shaft 14.

The thrust bearings above and below the thrust plate 22 are well known in this technology and are not significantly modified in this invention; therefore, they are not discussed further herein.

Figure 2:
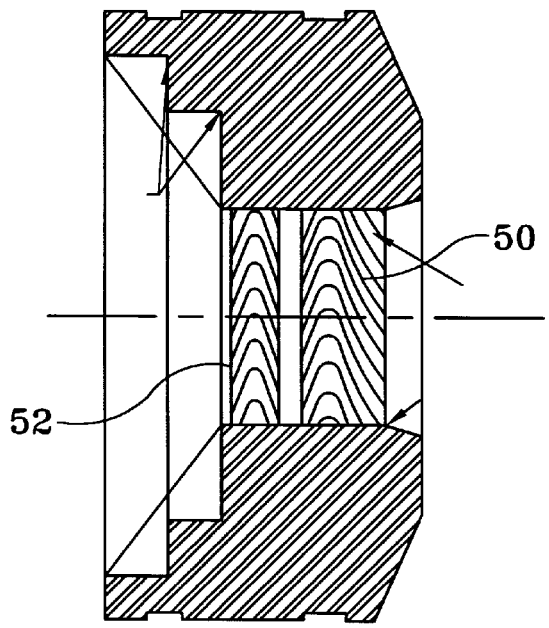
FIG. 2 is a sectional view of the sleeve of a motor similar to FIG. 1 but incorporating two separate journal bearings extending along the shaft of the motor.

As to the journal bearing, it is long been the accepted practice to provide upper and lower journal bearing sections 50, 52 as shown in FIG. 2 which is a sectional view of the sleeve 16 which is shown in FIG. 1. As clearly appears herein, the journal bearing is separated into two sections separated by a gap or span S; further, one of the two journal bearing sections 50 is longer than the other section 52, so that a net pressure is developed toward the end of the shaft where the thrust plate is supported. This is to prevent any fluid from escaping from the opposite end 54 of the shaft where the fluid is maintained in the gap primarily by the effects of a capillary seal.

However, the inventor of the present invention has realized that the same effectiveness could be achieved by a single continuous or substantially continuous journal bearing of substantially the same length as the journal bearings 50, 52. Moreover, the inventor herein has realized that in providing this single journal bearing, that the operating vibration frequency response which is transmitted to the disks supported on the hub of the motor could be reduced. Further, when the design is properly implemented, the power needed to rotate the shaft could be reduced, and the gap width between the shaft, and the surrounding sleeve widened, without diminishing the radial and angular stiffness of the bearing. A further feature of the invention is that historically the span S needed to be provided in order to maintain a reserve of fluid to maintain the fluid bearing in this gap section S between the upper and lower bearings. This reservoir in some instances was established by a recess in either the shaft or sleeve, or by providing a reservoir extending up through the center of the shaft and connected by a cross-bore to the gap between the shaft and sleeve.

However, by limiting the length of the single journal bearing, which the inventors have determined is optimized at a length which is about in a 1/1 ratio with the thickness or diameter of shaft, and providing the grooves 36 between the thrust plate 22 and the shaft outer surface to provides a flow return for the fluid, that the fluid could be properly maintained in the shaft sleeve gap. This is effective even when the gap is widened so that more fluid could be established therein.

Figure 3:
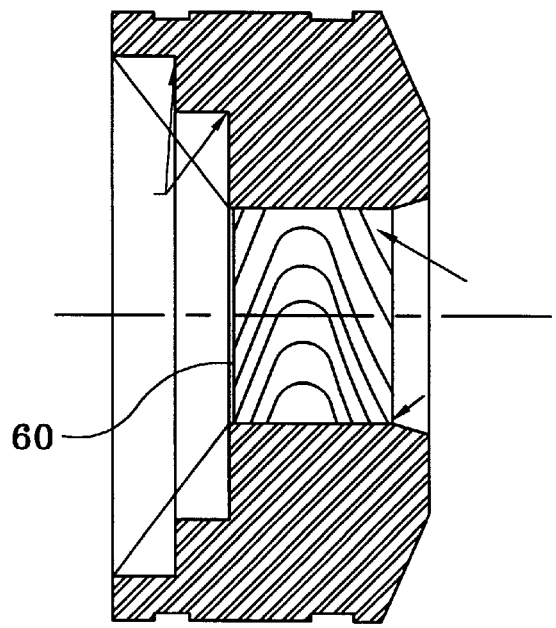
FIG. 3 is a sectional view of a sleeve incorporated in the motor of FIG. 1, incorporating the single journal bearing in accordance with this invention and including generally sinusoidal grooves extending along the sleeve facing the shaft of the motor.

Therefore, looking at FIG. 3, a single continuous journal bearing is defined by providing the groove pattern 60 along the journal bearing. As shown, this groove patterns is optimized by using grooves which are generally sinusoidal in curvature, and which are slightly offset along the length of the gap toward the thrust plate and thrust bearings. This both provides the proper fluid pressure distribution along the journal bearing, and prevents the fluid from exiting the journal bearing at the end distal from the thrust plate.

Figure 4:
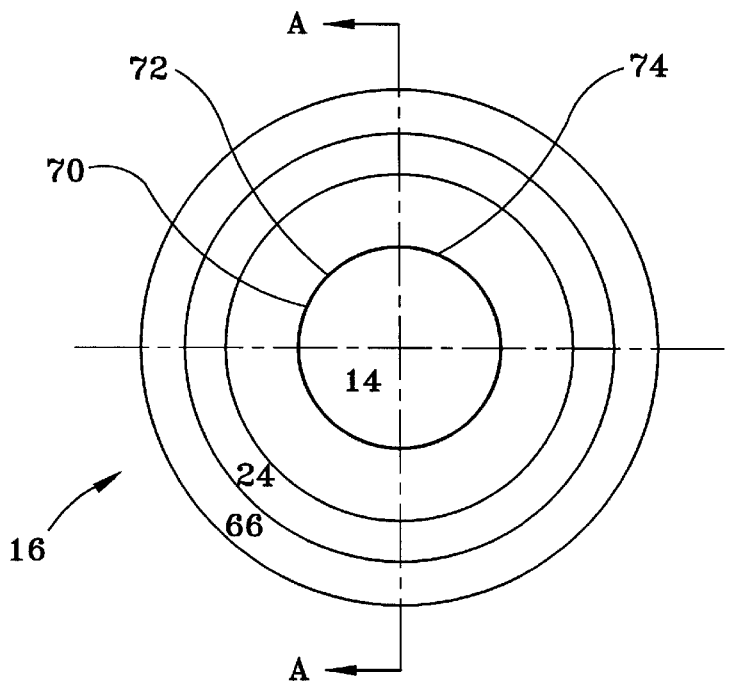
FIG. 4 is a horizontal sectional view of the motor shaft sleeve trust plate and counterplate of the motor of FIG. 1.

Specifically referring to FIG. 4, which is a section through the bearing sleeve combination shown in FIG. 1, we see the shaft 14 surrounded by the sleeve 16 and including a first recess 64 for allowing rotation of the thrust plate 24 and the second recess 66 for supporting the counterplate 26. The gap 70 is defined between the inner surface 72 of the sleeve 16 and the outer surface 74 of the shaft 14. The gap for motors having these dimensions has typically been about 3.5 $\mu$m; however, by adopting the present design, the gap can be widened to about 5 $\mu$m. The tests to be discussed in detail below have demonstrated that, even with this wider gap, the radial stiffness in the one bearing design is almost the same as that of the two bearing design, while the maximum displacement which occurs at low frequencies is decreased by up to eight times.

This substantial improvement in the performance with respect to stiffness and frequency response and f or lowering the power consumption was achieved with a journal gap increased from 3.5 $\mu$m to 5–6 $\mu$m. The power consumption was thereby reduced from 0.0214 watt to 0.0191 watt. Ten percent power was saved, an issue having primary importance in the field of mobile disc drives.

EXAMPLE I

| 2 Bearing Design Length of Bearings | |
|---|---|
| Outer | = 1.36 mm |
| Inner | = 0.84 mm |
| Space Between | = 0.5 mm |
| Total | = 2.7 mm; |
| 1 Bearing Design Length of Bearing | |
| L | = 2.7 mm |
| Bearing Gap | = 3.5 mm, |

(Note:
Due to asymmetry in the grooving pattern of about ⁻0.4 mm, the total length of both is about 3.1 mm. The bearing gap which determines the radial stiffness is 3.5 mm in both designs for comparison.

Simulations were run with the above parameters for finding the radial and angular stiffness and power consumption.

| Results | Radial Stiffness Rxx(N/m) | Angular Stiffness (Nm/radius) | Power |
|---|---|---|---|
| 2 Bearing Design | | | |
| UPPER JOURNAL | .977E3 | 0.137 | |
| LOWER JOURNAL | .349E3 | 0.794 | |
| TOTAL | 1.32E6 | 0.931 | 0.214 W |
| | Rxx (n/u) | Angular Stiffness | Power |
| 1 Bearing Design | 3.7E6 | 0.8 | 0.236 W |

The radial stiffness increased by 3.7/1.32 = 2.8 times.

Figure 5:
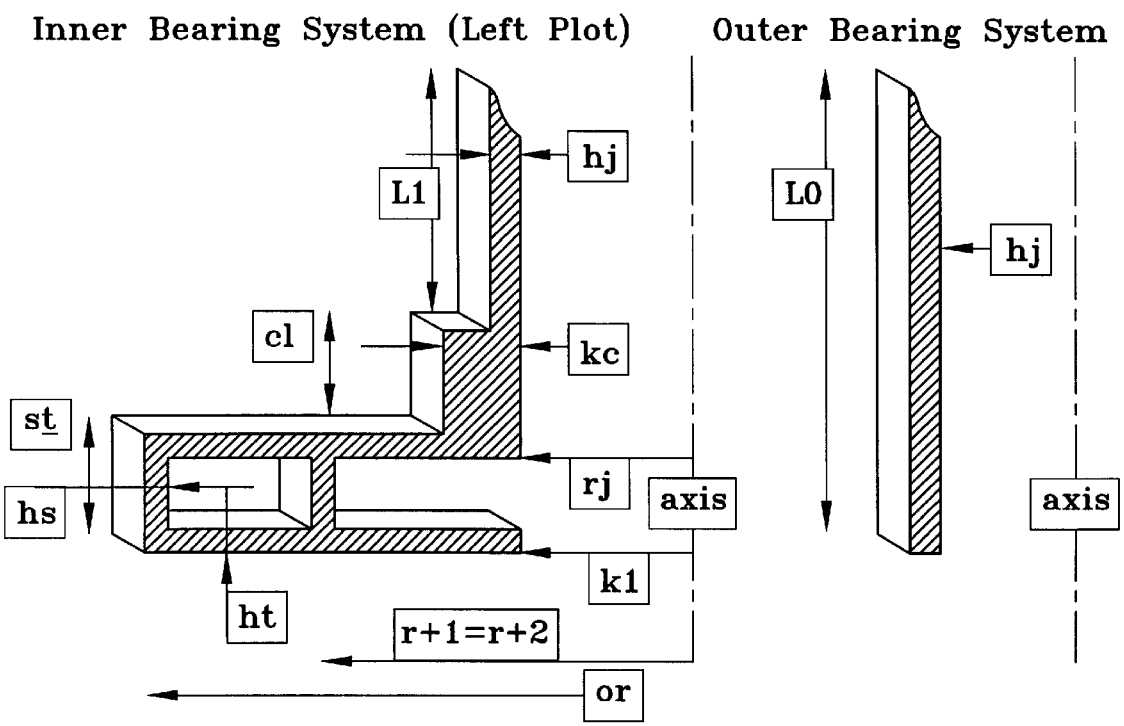
FIG. 5 is a vertical schematic view of the inner and outer bearing systems of the motor of FIG. 1 which can be used to explain analytically the improved stiffness of the system.

The variable inputs for different types of bearing designs are described below (for both 1 bearing and 2 bearings), with reference to the schematics of FIG. 5.

| | | |
|---|---|---|
| hg | (Journal gap) | = 3.5 Mm |
| Lj | (Length of inner bearing) | = 0.84 mm (2 bearing design) |
| | | = 0 mm (1 bearing design) |
| Cl | (Chamber length) | = 0.1 |
| hc | (Chamber clearance) | = 0.2 mm |
| rj | (Journal radius) | = 1.75 mm |
| st | (Thrust space length) | = 1.014 mm |
| hs | (Thrust space gap) | = 0.08 mm |
| ht | (Thrust gap) | = 7 $\mu$m |
| $rt_1$ = $rt_2$ | (Turning radius) | = 2.4 mm |
| Or | (Outer radius) | = 3.08 mm |
| Ln | (Length of outer bearing) | = 1.36 mm (2 bearing design) |
| | | = 2.7 mm (1 bearing design) |

Figure 6A:
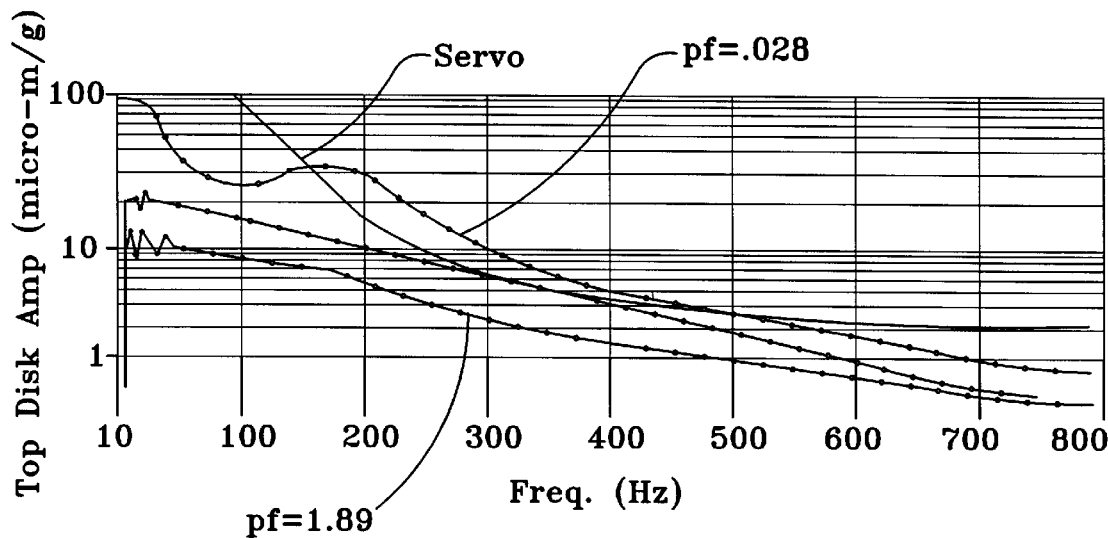
FIGS. 6A and 6B are graphs of test run on the motor of FIG. 1 when used with a prior art bearing as exemplified in FIG. 2 and the bearing of the present invention as shown in FIG. 3.
Figure 6B:
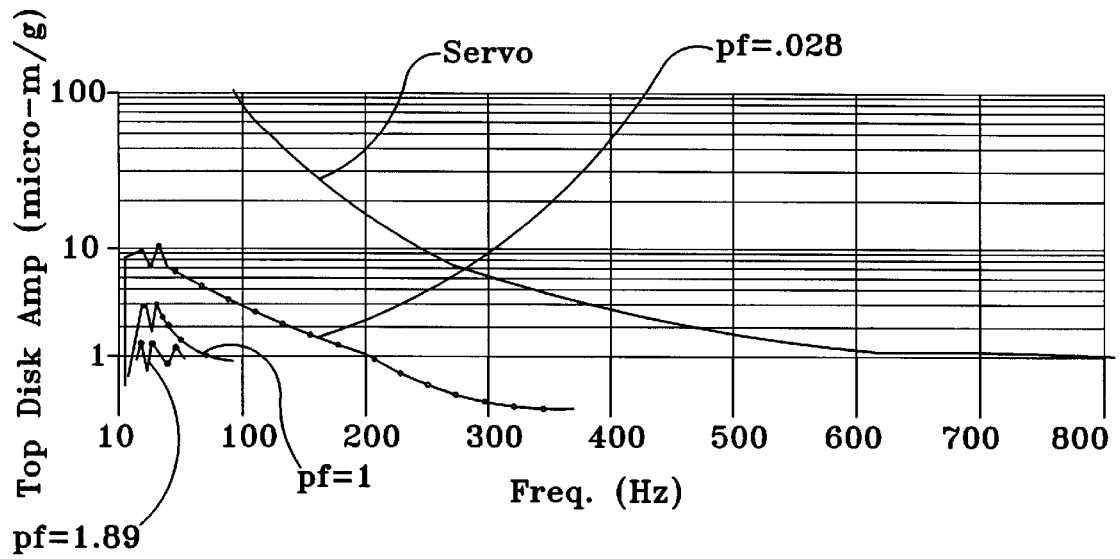

The frequency response developed for the two models are shown in FIG. 6A (two bearing design) and FIG. 6B (single bearing design).

Under the worst conditions (Temp.=70° C., pf=0.28 due to low oil viscosity), the ratio between the top disk amplitude 2 bearing/1 bearing=80/10≈8 at low frequencies. That is, the top disk (1 bearing design) moves 8 times less than the top disk (2 bearing design). It is also apparent that even under the worst conditions, the servo system is able to make the head track properly; this cannot be achieved with the two bearing design. Because of this substantial improvement in operating frequency response, the single bearing gap hj (between shaft and sleeve) can be increased for the purpose of power saving.

The relation between power and bearing parameter is as follows:

$$\text{Power Loss} \quad \alpha \quad \frac{M W^2 L R^3}{hj}$$

Figure 7:
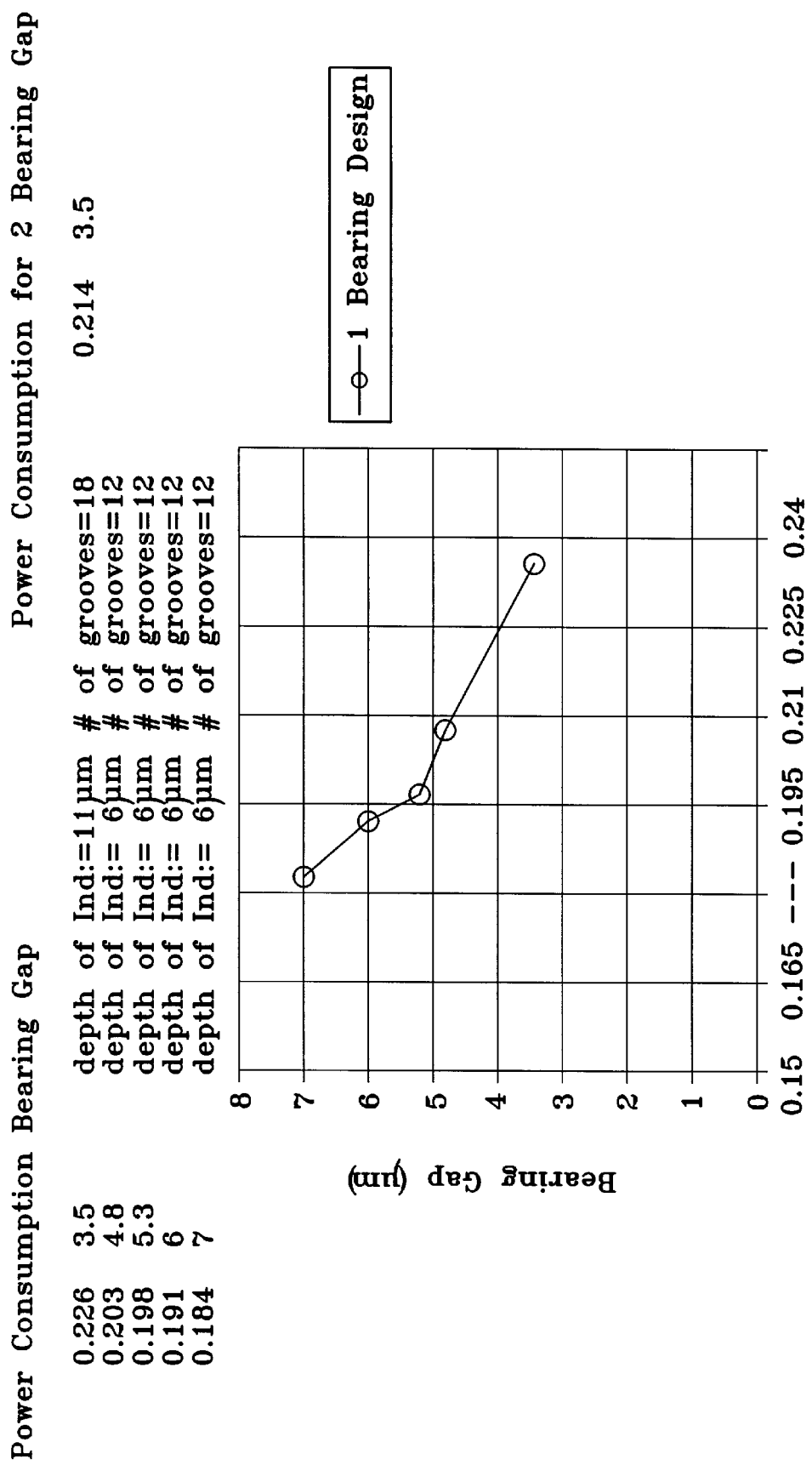
FIG. 7 is a graph of relative power consumption for single bearing and two journal bearing designs.

$\mu$ = Viscosity
$\omega$ = Angular speed
L = Bearing radius
R = Bearing radius
hj = Bearing gap As shown in FIG. 7, which graphs the results of the above equation, hj was changed having values of 3.5 $\mu$m, 4.8 $\mu$m, 5.3 $\mu$m, 6 $\mu$m and 7 $\mu$m while simulation programs were run for achieving an optimization between low power consumption and low top disk displacement (frequency response). The graph of FIG. 7 shows the power consumption as a function of gap in the bearing; the improvement achieved by a single journal bearing with a wider bearing gap is immediately evident.

Figure 8A:
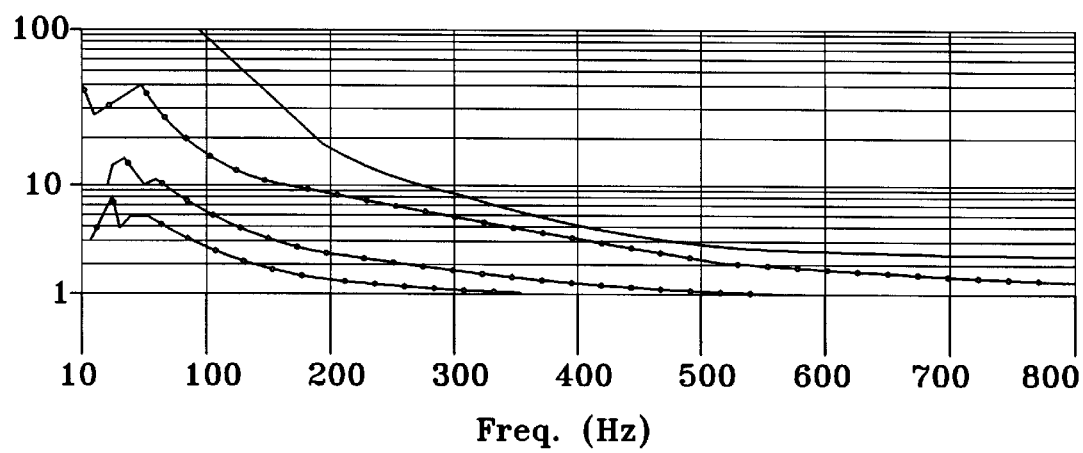
FIGS. 8A and 8B illustrate disc displacement at various frequencies when utilizing this, invention.
Figure 8B:
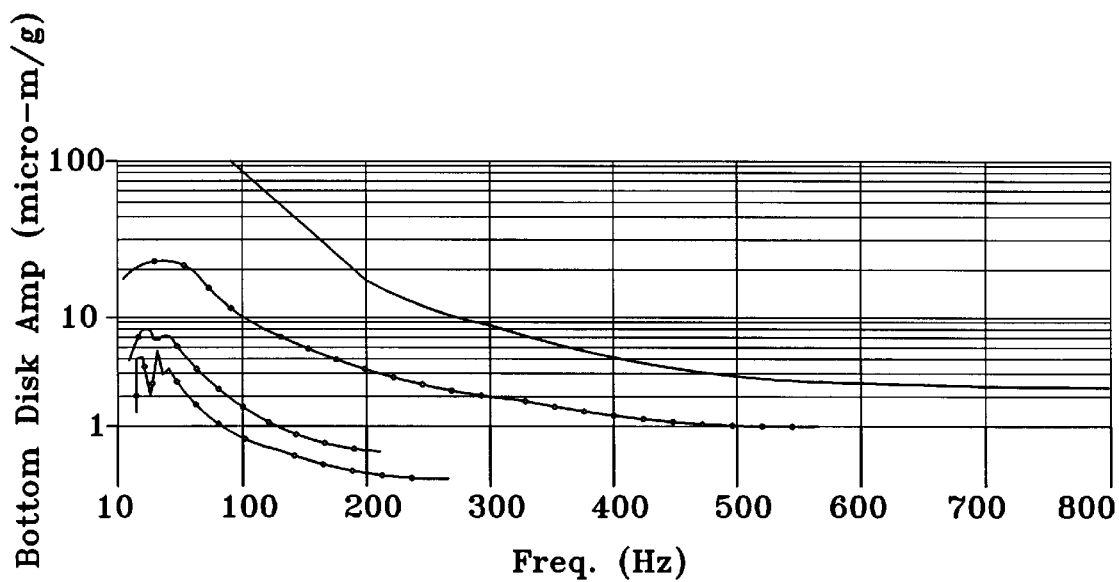

The 6µ gap frequency response is shown in FIGS. 8A and 8B. At this gap, the power savings relative to the 2 bearings is 10% lower.

The maximum top disk displacement at low frequencies is 40 µmm/g, (see FIG. 8A) half the displacement of a 2 bearing design; the maximum bottom disc displacement is even less.

What is claimed is:

1. A hydrodynamic bearing comprising a sleeve and a shaft fitted into an axial bore of said sleeve, said shaft and said sleeve rotating relative to each other, a surface of said shaft defining together with a surface of said sleeve a single journal bearing comprising a single group of continuous curved grooves formed on one of said surfaces of said shaft and said sleeve and extending continuously along said one surface and offset toward thrust plate so that said shaft is stiffly supported within said sleeve by a fluid in a gap between said shaft and said sleeve during relative rotation of said shaft and said sleeve; said shaft further supporting an annular thrust plate, said thrust plate extending into a recess formed by an axial face of said sleeve to form a first gap, and a counterplate parallel to said thrust plate and attached to said sleeve to form a second gap, an axial face of said thrust plate defining together with the adjacent thrust plate surface a first thrust bearing including said first gap and fluid therein, and the second gap between said thrust plate and said counterpart forming a second thrust bearing with fluid therein, and wherein grooves are defined connecting said second gap to said first gap so that said fluid bearing fully supports said shaft within said sleeve.

2. A hydrodynamic bearing as claimed in claim 1 wherein a diameter of said sleeve has a ratio to a length of said journal bearing of about 1:1.

3. A bearing as claimed in claim 1 wherein the gap between the shaft and the surrounding sleeve is 5 to 7 microns.

4. A hydrodynamic bearing comprising a sleeve and a shaft fitted into an axial bore of said sleeve, said shaft and said sleeve rotating relative to each other, a surface of said shaft defining together with a surface of said sleeve a single journal bearing comprising a single group of continuous curved grooves formed on one of said surfaces of said shaft and said sleeve and extending continuously along said one surface and offset toward thrust plate so that said shaft is stiffly supported within said sleeve by a fluid in a gap between said shaft and said sleeve during relative rotation of said shaft and said sleeve; said shaft further supporting an annular thrust plate, said thrust plate extending into a recess formed by an axial face of said sleeve to form a first gap, and a counterplate parallel to said thrust plate and attached to said sleeve to form a second gap, an axial face of said thrust plate defining together with the adjacent thrust plate surface a first thrust bearing including said first gap and fluid therein, and the second gap between said thrust plate and said counterpart forming a second thrust bearing with fluid therein, and wherein a first end of said journal bearing distal from said annular thrust plate terminates in a capillary seal formed between said bushing integral with said sleeve and said shaft of said motor.

5. A spindle as claimed in claim 4 wherein said surfaces of said sleeve is inclined away from said shaft to form said capillary seal.

6. A bearing as claimed in claim 5 wherein said curved grooves are generally sinusoidal.

7. A bearing as claimed in claim 4 wherein said curved grooves are generally sinusoidal.

8. A bearing as claimed in claim 1 wherein said curves grooves are generally sinusoidal.

9. A hydrodynamic bearing as claimed in claim 8, wherein a diameter of said sleeve has a ratio to a length of said journal bearing of about 1:1.

10. A hydrodynamic bearing comprising a sleeve and a shaft fitted into an axial bore of said sleeve, said shaft and said sleeve rotating relative to each other, a surface of said shaft defining together with a surface of said sleeve a single journal bearing comprising a single group of continuous curved grooves formed on one of said surfaces of said shaft and said sleeve and extending continuously along said one surface and offset toward thrust plate so that said shaft is stiffly supported within said sleeve by a fluid in a gap between said shaft and said sleeve during relative rotation of said shaft and said sleeve; said shaft further supporting an annular thrust plate, said thrust plate extending into a recess formed by an axial face of said sleeve to form a first gap, and a counterplate parallel to said thrust plate and attached to said sleeve to form a second gap, an axial face of said thrust plate defining together with the adjacent thrust plate surface a first thrust bearing including said first gap and fluid therein, and the second gap between said thrust plate and said counterpart forming a second thrust bearing with fluid therein, and wherein a diameter of said sleeve has a ratio to a length of said journal bearing of about 1:1.

11. A bearing as claimed in claim 10 wherein said curved grooves are generally sinusoidal.

* * * * *